United States Patent [19]

Kasano

[11] Patent Number: 4,827,432
[45] Date of Patent: May 2, 1989

[54] IMAGE DATA OPERATION PROCESSING APPARATUS

[75] Inventor: Akira Kasano, Tokyo, Japan

[73] Assignee: Kabushiki Kaisha Toshiba, Kawasaki, Japan

[21] Appl. No.: 910,670

[22] Filed: Sep. 23, 1986

[30] Foreign Application Priority Data

Sep. 30, 1985 [JP] Japan .................. 60-216553

[51] Int. Cl.⁴ .............................................. G06F 15/62
[52] U.S. Cl. .................... 364/518; 358/160; 382/41; 364/736
[58] Field of Search ............ 364/518, 522, 736; 358/160; 382/41

[56] References Cited

U.S. PATENT DOCUMENTS

| | | | |
|---|---|---|---|
| 4,398,176 | 8/1983 | Dargel et al. | 382/27 |
| 4,463,380 | 7/1984 | Hooks, Jr. | 358/160 |
| 4,635,292 | 1/1987 | Mori et al. | 382/41 |
| 4,665,556 | 5/1987 | Fukushima et al. | 382/41 |
| 4,700,319 | 10/1987 | Steiner | 364/518 |

Primary Examiner—Gary V. Harkcom
Assistant Examiner—Randy W. Lacasse
Attorney, Agent, or Firm—Finnegan, Henderson, Farabow, Garrett & Dunner

[57] ABSTRACT

An image data operation processing apparatus having a controller for transferring specified image data and generating various processing commands in accordance with an operation command input from an external unit. The controller reads out the specified image data from a plurality of image memories for storing n-bit, image data, and outputs the readout data to an operation unit. The operation unit includes an image data processor capable of performing a linear combination operation and obtaining the absolute value of a difference, and a look up table unit. The look up table unit includes a table generator, a conversion processor for receiving image data, the total number of bits of which does not exceed a maximum of m bits (m is an integer satisfying $3n/2 \leq m < 2n$) and for performing data conversion, and a table memory. The table generator generates a table in response to a table generation command from the controller and stores it in the table memory. When image data is transferred by the controller and a linear combination command or a subtraction command is generated therefrom, the image data processor looks up the table memory in response to a data conversion command from the controller and obtains data corresponding to the input image data.

19 Claims, 16 Drawing Sheets

FIG. 11

| ADDRESS: 256Y'+X | LUT0: 2X+Y' |
|---|---|
| 0000 0000 0000 | 0000 0000 0000 0000 |
| ⋮ | ⋮ |
| 0001 1011 0111 | 0000 0001 0110 1111 |
| 0001 1011 1000 | 0000 0001 0111 0001 |
| ⋮ | ⋮ |
| 0001 1111 1111 | 0000 0001 1111 1111 |

FIG. 12

| ADDRESS: A+256$B_2$ | LUT1: A×$B_2$ |
|---|---|
| 0000 0000 0000 | 0000 0000 0000 0000 |
| ⋮ | ⋮ |
| 0011 1010 0100 | 0000 0001 1110 1100 |
| 0011 1010 0101 | 0000 0001 1110 1111 |
| ⋮ | ⋮ |
| 1111 1111 1111 | 0000 1110 1111 0001 |

FIG. 13

| ADDRESS: A+256B₁ | LUT2: A×B₁ |
|---|---|
| 0000 0000 0000 | 0000 0000 0000 0000 |
| ⋮ | ⋮ |
| 0011 1010 0100 | 1100 0000 0001 1110 |
| 0011 1011 0101 | 1111 0000 0001 1110 |
| ⋮ | ⋮ |
| 1111 1111 1111 | 0001 0000 1110 1111 |

FIG. 14

| ADDRESS: X₂+256Y₂ | LUT3: X₂+16Y₂ |
|---|---|
| 0000 0000 0000 | 0000 0000 0000 0000 |
| ⋮ | ⋮ |
| 0011 1010 0100 | 0000 0000 1101 0100 |
| 0011 1010 0101 | 0000 0000 1101 0101 |
| ⋮ | ⋮ |
| 1111 1111 1111 | 0000 0001 1110 1111 |

FIG. 15

| ADDRESS: $A_1 \div N(=160)$ | LUT 4: QUOTINENT | | | |
|---|---|---|---|---|
| 0000 0000 0000 | 0000 | 0000 | 0000 | 0000 |
| ⋮ | ⋮ | | | |
| 1010 1101 0010 | 0000 | 0000 | 1111 | 1011 |
| 1010 1101 0011 | 0000 | 0000 | 1111 | 1011 |
| ⋮ | ⋮ | | | |
| 1111 1111 1111 | 0000 | 0001 | 0111 | 0100 |

FIG. 16

| ADDRESS: $A_1 \div N(=160)$ | LUT 5: SURPLUS | | | |
|---|---|---|---|---|
| 0000 0000 0000 | 0000 | 0000 | 0000 | 0000 |
| ⋮ | ⋮ | | | |
| 1010 1101 0010 | 0000 | 0000 | 1001 | 0000 |
| 1010 1101 0011 | 0000 | 0000 | 1010 | 0000 |
| ⋮ | ⋮ | | | |
| 1111 1111 1111 | 0000 | 0000 | 0011 | 0000 |

FIG. 17

| ADDRESS: $256A_2+R$ | LUT 6: QUOTINENT | | | |
|---|---|---|---|---|
| 0000 0000 0000 | 0000 | 0000 | 0000 | 0000 |
| ⋮ | ⋮ | | | |
| 0101 1010 1100 | 0000 | 0000 | 0000 | 0001 |
| 0101 1010 1101 | 0000 | 0000 | 0000 | 0001 |
| ⋮ | ⋮ | | | |
| 1111 1111 1111 | 0000 | 0000 | 0000 | 0001 |

IMAGE DATA OPERATION PROCESSING APPARATUS

BACKGROUND OF THE INVENTION

The present invention relates to an image data operation processing apparatus which has a plurality of n-bit image memories and performs a maximum of 2n-bit image data operations.

Conventionally, an image data operation processing apparatus which processes 2n-bit image data, e.g., 16-bit image data, is often constituted by a normal computer. In this case, since image data operation processing is executed by the computer, image data must be transferred from image memories to a main memory of the computer. After the necessary calculation, the data must be sent back to the image memories. However, such data transfer takes a great deal of time. In order to realize a good man-machine interface, an operation processing apparatus itself becomes bulky, resulting in increased cost. For this reason, it is difficult to use such an apparatus in a small system.

Conversely, in a small system, if a microcomputer is used, operation speed is decreased and good manmachine interface cannot be obtained.

It may be proposed to develop a special-purpose processor for performing 16-bit image data operation. However, such a processor requires a complex hardware arrangement compared with an 8-bit image data operation processor. Therefore, such a processor is difficult to realize and results in high cost.

SUMMARY OF THE INVENTION

The present invention has been made in consideration of the above situation, and has as its object to provide an image data operation processing apparatus which performs a maximum of 2n-bit operations among image data stored in n-bit image memories (n is an even number). The operation processing apparatus comprises:

image data operation means for receiving K n-bit image data in accordance with a linear combination command of input commands, generating n-bit image data linearly combined as indicated by the following relation, and generating an absolute value of a difference between two input n-bit image data:

$$C = \left( \sum_{i=1}^{k} a_i A_i + b \right) / 2^S$$

where $A_i$ is input ith n-bit image data, $a_i$ is a coefficient for the ith n-bit image data, b is a bias number, S is a shift bit number, and C is n-bit linearly combined image data;

look up table means for receiving an image data portion which does not exceed a maximum of m bits (m is an integer satisfying $3n/2 \leq m < 2n$) in accordance with a data conversion command of the input commands and looking up a data conversion table representing an operation result of the input image data indicated by the data conversion command to generate the operation result; and control means for reading out image data stored in the n-bit image memory in accordance with an operation command supplied from an external circuit, generating a command, outputting the command and the readout image data, causing the image data operation means and at least one of the look up table means to generate an operation result, and receiving the generated operation result to store it in the n-bit image memory.

It is another object of the present invention to provide a method for performing a maximum of 2n-bit operations for image data stored in a plurality of n-bit image memories (n is an even number). The method comprises:

outputting commands in response to an operation command from an external circuit;

reading out image data from the image memory in accordance with the operation command to output it;

linearly combining input K n-bit image data in response to a linear combination command of the commands in accordance with the following relation and generating an n-bit linear combination operation result, $$C = \left( \sum_{i=1}^{k} a_i A_i + b \right) / 2^S$$

where $A_i$ is ith n-bit image data, $a_i$ is a coefficient for image data $A_i$, b is a bias number, S is a shift bit number, and C is n-bit linearly combined image data;

generating an absolute value of a difference of two input n-bit image data in response to a difference absolute value operation command of the commands;

receiving image data which does not exceed a maximum of m bits (m is an integer satisfying $3n/2 \leq m < 2n$) in accordance with a data conversion command of the commands and looking up a data conversion table representing an operation result indicated by the data conversion command in accordance with input image data so as to generate a data conversion operation result;

effecting at least one of generating the linear combination operation result, generating the absolute value of the difference, and generating the data conversion operation result, so as to generate an operation processing result; and storing operation-processed image data into the image memory.

According to the present invention as described above, 2n-bit operations can be performed at high speed using a small-scale processor, e.g., an n-bit image data processor, and good man-machine interface can be achieved.

BRIEF DESCRIPTION OF THE DRAWINGS

FIGS. 11 to 17 are tables for a look up table shown in FIG. 1, in which FIG. 11 shows table LUT0, FIG. 12 shows table LUT1, FIG. 13 shows table LUT2, FIG. 14 shows table LUT3, FIG. 15 shows table LUT4, FIG. 16 shows table LUT5, and FIG. 17 shows table LUT6;

DESCRIPTION OF THE PREFERRED EMBODIMENTS

An image data operation processing apparatus according to an embodiment of the present invention will now be described with reference to the accompanying drawings.

Figure 1:
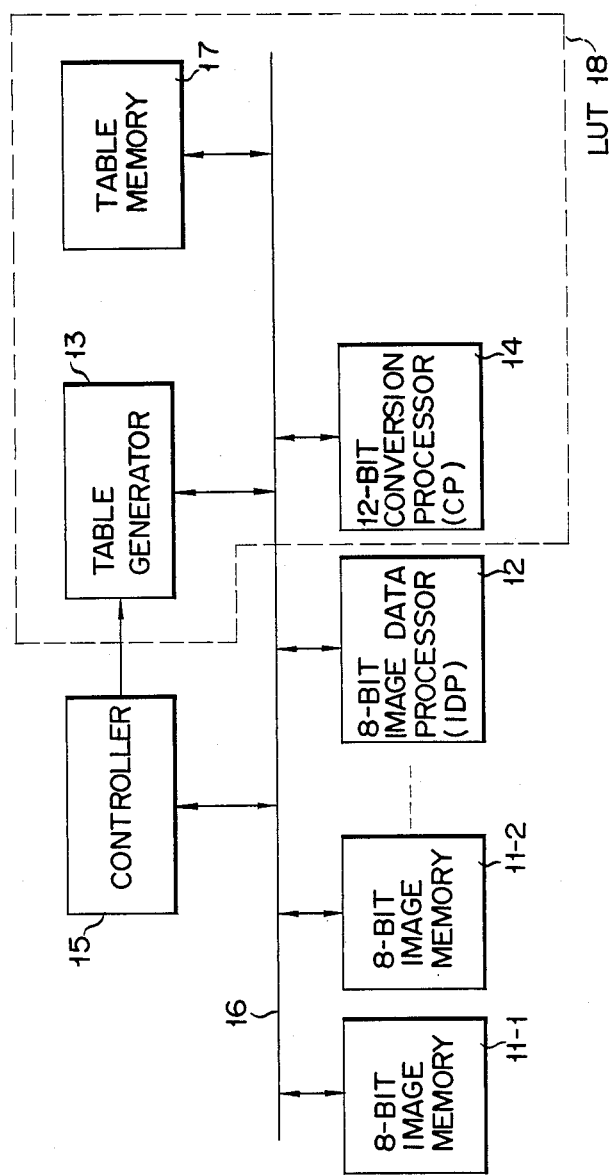
FIG. 1 is a block diagram showing a 2n-bit image data operation processing apparatus according to an embodiment of the present invention.

An arrangement of the image data operation processing apparatus according to the embodiment of the present invention will be described below with reference to FIG. 1. In this embodiment, the apparatus comprises controller 15, connected to bus line 16, for controlling operation processing, n-bit, e.g., 8-bit image memories 11-1, 11-2, . . . , connected to bus line 16, image data processor (IDP) 12 for executing a linear combination operation and a difference absolute value operation upon reception of n-bit image data, and LUT (Look Up Table) 18 for obtaining predetermined operation results using a maximum of m-bit image data (m is a positive integer satisfying $3n/2 \leq m \leq 2n$), e.g., 12-bit image data as operation data.

In the linear combination operation of IDP 12, the following operation is executed with respect to a maximum of three 8-bit image data upon instruction from controller 15 to generate 8-bit image data:

$$M = \{(aA + bB + cC) + \alpha\}/2^s$$

where A, B, and C are image data of a maximum of 8 bits, a, b, and c are integral combination coefficients for image data A, B, and C, respectively, $\alpha$ is a bias number, and S is a shift bit number.

LUT 18 comprises table generator 13 for generating a table of predetermined operation results using image data, in which the total number of bits constituting image operation data is a maximum of 12 bits, as operation data upon instruction from controller 15; table memory 17 for storing the table of the operation results; and conversion processor 14 for sorting image data, in which the number of bits constituting at least one input image data does not exceed a maximum of 12 bits, in a predetermined format and for outputting it to table memory 17 to obtain the instructed operation result.

IDP 12 holds the coefficients, the bias number, and the shift bit number indicated by the linear combination instruction until they are changed by the next linear combination command. CP14 processes input image data in accordance with the same data conversion instruction until the next data conversion instruction is input.

In the embodiment shown in FIG. 1, (1) 16-bit addition, (2) 16-bit multiplication, and (3) 16-bit division for image data will now be described with reference to FIGS. 2A to 17.

Figure 2A:
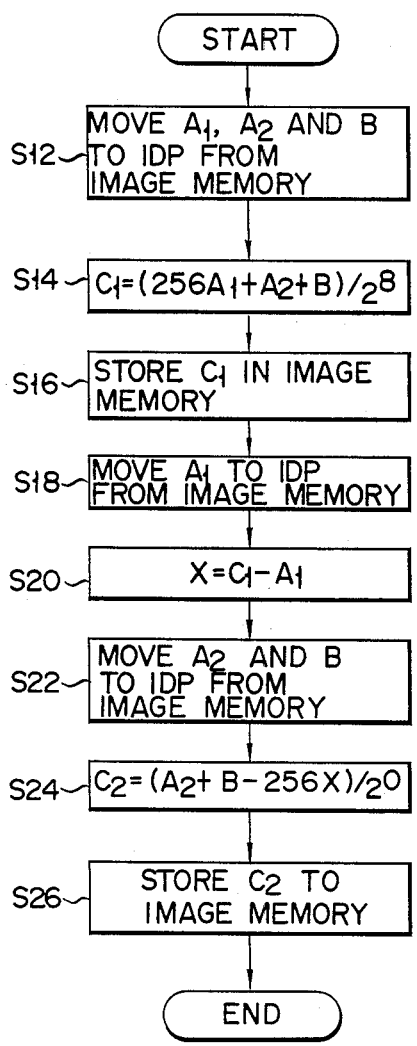
FIG. 2A is a flowchart for performing 16-bit addition of 16-bit image data and 8-bit image data in the embodiment shown in FIG. 1.

An operation of (1) 16 bits+8 bits (16-bit addition) will be first explained with reference to the flowchart shown in FIG. 2A.

Assume that 16-bit image data A (=256A1+A2) is stored in 8-bit image memories 11-1 and 11-2, and 8-bit image data B is stored in image memory 11-3.

At this time, if 16-bit data as a sum of image data A and B is given by C, C can be expressed by:

$$\begin{aligned} C &= A + B \\ &= (2^8 A1 + A2) + B \\ &= (256 A1 + A2) + B \\ &= 256 C1 + C2 \end{aligned} \quad (1)$$

In this embodiment, a 16-bit addition is performed in accordance with relation (1).

In response to a 16-bit addition command from an external circuit, controller 15 outputs a linear combination command to IDP 12 so that combination coefficients for data A1, A2, and B are respectively 256, 1, and 1, and shift bit number S is 8, in order to obtain upper 8-bits C1 after addition. Thereafter, controller 15 reads out 16-bit image data A (256A1+A2) from image memories 11-1 and 11-2 and 8-bit image data B from image memory 11-3 and supplies the readout data to IDP 12, as shown in step S12 in FIG. 2A. The data flow corresponding to the above operation is indicated by arrows K2, K3, and K10 in FIG. 5. Note that in image data, e.g., 16-bit data A, the rightmost bit is bit 15 and the leftmost bit is bit 0 unlike normal binary data, and data A1 and A2 are to be referred to as upper and lower data hereinafter.

In this case, 16-bit image data A and 8-bit image data B are transferred to IDP 12 through data bus 16. If data bus 16 consists of a single 8-bit bus, data is time-serially transferred in units of bits. If data bus 16 consists of a plurality of 8-bit buses, data is output in parallel.

Upon reception of image data, IDP 12 executes linear combination operation of $C1 = (256A1 + A2 + B)/2^8$ in accordance with the above-mentioned linear combination command, as shown in step S14.

In step S16, controller 15 stores operation result C1 in an image memory indicated by the operation command, e.g., in image memory 11-4, as indicated by arrow K4.

Controller 15 drives IDP 12 again to execute the following subtraction in order to set data (1-bit) indicating whether or not a carry of upper 8-bits is performed:

$$X = C1 - A1$$

For this purpose, controller 15 sends a subtraction processing command, i.e., the linear combination command, to IDP 12, so that the coefficient for data C1 is 1, the coefficient for data A1 is $-1$, and the shift bit number is 0. In step S18, controller 15 accesses image memory 11-1 to read out image data A1 and supplies it to IDP 12, as indicated by arrow K1. In step S20, IDP 12 executes subtraction of $X = C1 - A1$ between image data C1 stored therein and input image data A1.

Finally, in order to calculate lower 8-bit data C2 after addition, controller 15 sends the linear combination command to IDP 12, so that the combination coefficients for data A2, B, and X are respectively 1, 1, and $-256$, and the shift bit number is 0. In step S22, controller 15 accesses image memories 11-2 and 11-3 to supply image data A2 and B to IDP 12, as indicated by arrows K6 and K7. In step S24, IDP 12 executes the following linear combination operation in response to the linear combination command:

$$C2 = (A2 + B - 256X)/2^0$$

At this time, if no carry is performed, X=0. Therefore, C2 coincides with the 8-bit sum of data A2 and B. In contrast to this, if a carry is performed, C2 corresponds to a value obtained by subtracting a 256-multiple of X from the sum. Note that values of 255 and 0 are set in 8-bit IDP 12 in the case of overflow and underflow during addition and subtraction.

In step S26, the operation result is read out by controller 15 and is stored in image memory 11-5, as indicated by arrow K9. In this manner, 16-bit addition between 16-bit image data and 8-bit image data is performed.

Figure 2B:
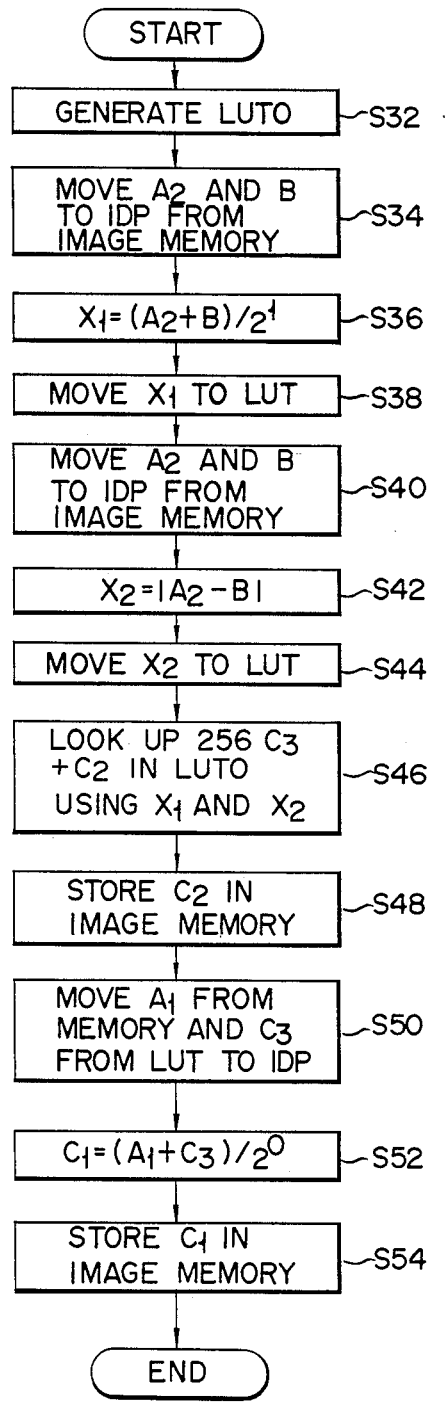
FIG. 2B is another flowchart therefor.

A 16-bit addition can also be performed in accordance with the flowchart shown in FIG. 2B.

First, controller 15 generates a table 0 generating command to enable table generator 13 in LUT 18 in response to an input 16-bit addition command. In step S32, table generator 13 in LUT 18 generates a table LUT0 shown in FIG. 11 and stores it in table memory 17.

In step S34, controller 15 supplies a linear combination command to IDP 12, so that the combination coefficients for image data A2 and B are respectively 1 and 1, and shift bit number S is 1. Next, controller 15 accesses image memories 11-2 and 11-3 to read out image data A2 and B, and supplies the readout data to IDP 12, as indicated by arrows K11 and K13 in FIG. 6. In step S36, IDP 12 executes average addition (A2+B)/2 between the lower 8-bit data A2 of data A and data B. Operation result X1 therefrom is read out by controller 15 and is supplied to conversion processor 14 of LUT 18, in step S38.

In step S40, controller 15 supplies a difference absolute value operation command to IDP 12. Controller 15 accesses image memories 11-2 and 11-3 so as to read out image data A2 and B, and supplies them to IDP 12, as indicated by arrows K12 and K14. Upon reception of these data, IDP 12 calculates absolute value X2=|A2−B| of the difference between the two input image data in step S42. Since the LSB of absolute value X2 coincides with the LSB of lower 8-bit data C2 after addition, it is used for obtaining the sum of data A2 and B.

The coincidence between the LSBs of data X2 and C2 can also be apparent from the fact that the difference between a pair of even data or odd data yields an even number, and the difference between even and odd data yields an odd number. For the same reason, the LSB of the average addition result coincides with the LSB of the lower 8-bits after addition. Therefore, average addition is performed instead of obtaining the difference, and the resultant lower 8-bits can be used as data X2.

In step S44, controller 15 generates a table 0 conversion command to look up table LUT0, and transfers obtained value X2 to conversion processor 14 of LUT 18, as indicated by arrow K16. Processor 14 combines two inputs X1 and X2 in response to the table 0 conversion command, and obtains the sum of data C3 and C2 by looking up table LUT0, as indicated by arrow K22.

At this time, conversion processor 14 combines the LSB of data X2 (8 bits) and data X1 (8-bits) to obtain 256 (the LSB of X2)+X1 to form single 9-bit data I, and then performs data conversion by looking up data conversion table LUT0.

Relation 2X1+(the LSB of X2)+X1 is registered at address I of table LUT0. As shown in FIG. 11, for example, if data X1 is "10110111" and the LSB of data X2 is "1", data I is "0001 10110111", and data converted using table LUT0 is "0000 0001 01101111".

After conversion processing, controller 15 stores data C2 in image memory 11-5, as indicated by arrow K17.

Thereafter, in step S50, controller 15 generates a linear combination command so that the combination coefficients for image data A1 and C3 are 1 and 1, respectively, and shift bit number S is 0. Upper 8-bit data A1 of 16-bit image data is read out from image memory 11-1, and is transferred to IDP 12, as indicated by arrow K19. Data C3 is read out from processor 14 and is transferred to IDP 12, as indicated by arrow K18.

In step S52, upon reception of the data, IDP 12 executes the linear combination operation to calculate data C1 in response to the linear combination command. Calculated data C1 is transferred to and stored in image memory 11-4 in step S54, as indicated by arrow K20.

As described above, the 16-bit addition between 16-bit image data and 8-bit image data is executed.

Figure 3:
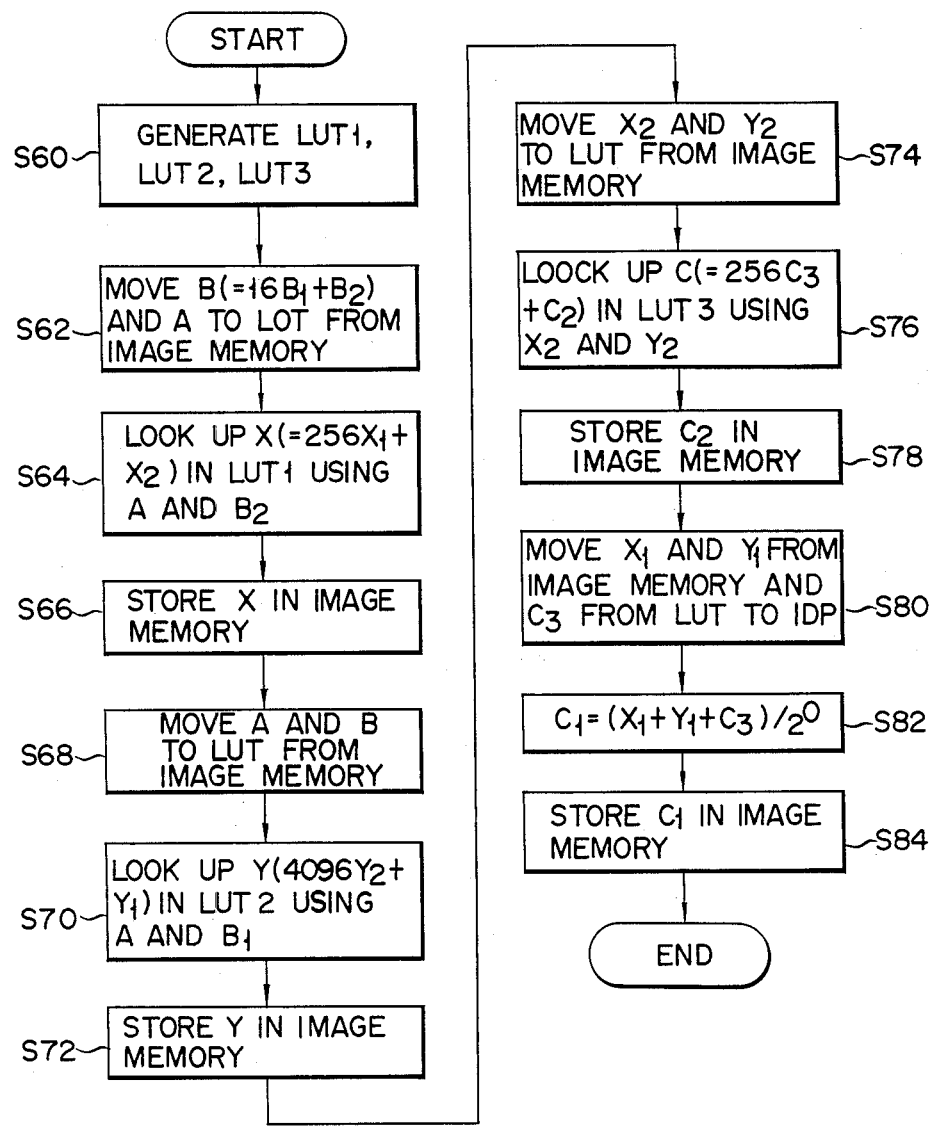
FIG. 3 is a flowchart for performing 16-bit multiplication between 8-bit image data.

(2) 8-bits×8-bits 16-bit multiplication processing will be described with reference to the flowchart shown in FIG. 3.

Assuming that image data A and B (=16B1+B2) to be operated are respectively stored in image memories 11-1 and 11-2, and the operation result is stored in image memories 11-3 and 11-4 in response to an operation command from an external circuit.

If upper 4-bits of data B are given by B1 and lower 4-bits are given by B2, A×B can be expressed by:

$$A \times B = A \times (16B1 + B2) \qquad (2)$$
$$= 16 \times (A \times B1) + (A \times B2)$$

In this embodiment, the 16-bit multiplication is performed in accordance with relation (2).

In step S60, controller 15 supplies a table 1 generation command, a table 2 generation command, and a table 3 generation command to table generator 13 of LUT 18 in response to an operation command from the external circuit. In response to these commands, generator 13 generates tables LUT1, LUT2, and LUT3 shown in FIGS. 12 to 14. The generated table data are stored in table memory 17.

In step S62, controller 15 supplies a table 1 conversion command to conversion processor 14. Image data A is read out from image memory 11-1, and is supplied to conversion processor 14, as indicated by arrow K31 in FIG. 7. Image data B is read out from image memory 11-2 and is supplied to processor 14, as indicated by arrow K32.

Processor 14 obtains a product of data A and data B2 corresponding to lower 4 bits of data B from two input image data A and B by looking up table LUT1, as indicated by arrow K33.

At this time, product X (=256X1+X2) (12 bits) of A×B2 is pre-registered in data conversion table LUT1, as indicated by the following relation:

$$LUT1(I) = x = A \times B2$$

where I=A+256B2

For example, if data A is "1010 0100" and data B2 is "0011", table LUT1 is looked up by substituting "0011 1010 0100" for data I and, as a result, data "0000 0001 1110 1100" can be obtained.

In step S66, as indicated by arrow K34, of data X (=256X1+X2) obtained by conversion, data X1 is stored in image memory 11-1 and data X2 is stored in image memory 11-2.

In step S68, controller 15 supplies a table 2 conversion command to conversion processor 14. Image data A and B are again read out from image memories 11-1 and 11-2, and are supplied to processor 14, as indicated by arrows K36 and K37. In step S70, processor 14 obtains product A×B1 of data A and upper 4-bit data B1 of data B by looking up table LUT2.

Product Y (=256Y1+16 Y2l) of A×16B1 is registered in data conversion table LUT2 to yield 4096Y2+Y1 (16 bits). That is, $$Y = A \times B1 = 256Y1 + 16\ Y2$$

$$LUT2(I) = 4096Y2 + Y1$$

where I=A+256B1

For example, if data A is "1010 0100" and data B1 is "0011", table LUT2 is looked up by substituting "0011 1010 0100" for data I and, as a result, data "1100 0000 0001 1110" is obtained. In step S72, as indicated by arrow K39, of resultant data Y, data Y2 is stored in image memory 11-1 and data Y1 is stored in image memory 11-2. At this time, table LUT2 can output, e.g., 256Y1+16Y2.

Thereafter, in step S74, controller 15 supplies a table 3 conversion command to conversion processor 14. Image data X2 and Y2 are read out from image memories 11-1 and 11-2 and are supplied to processor 14, as indicated by arrows K51 and K52. In step S76, processor 14 looks up table LUT3 to obtain a sum in response to the table 3 conversion command.

At this time, the sum of two image data is stored at address I of conversion table LUT3. That is, $$LUT3(I) = C = X2 + 16Y2$$

where I=X2+256Y2 For example, if data X2 is "1010 0100" and data Y2 is "0011", data "0000 0000 1101 0100" is obtained as shown in FIG. 14. Of resultant data C (=256C3+C2), data C2 is stored in image memory 11-4 in step S78, as indicated by arrow K54.

In step S80, controller 15 supplies a linear combination command to IDP 12, so that the combination coefficients for data X1, Y1, and C3 are 1, 1, and 1, respectively, and shift bit number S is 0. Data X1 is read out from image memory 11-1, data Y1 is read out from image memory 11-2, and they are supplied to IDP 12, as indicated by arrows K55 and K56. Data C3 is read out from conversion processor 14, and is supplied to IDP 12, as indicated by arrow K57. Thus, upper 8-bit data C1 of 16-bit multiplication can be obtained. Resultant data C1 is stored in image memory 11-3 in step S84, as indicated by arrow K58.

In this manner, 16-bit multiplication processing of a pair of 8-bit image data can be performed.

Figure 4A:
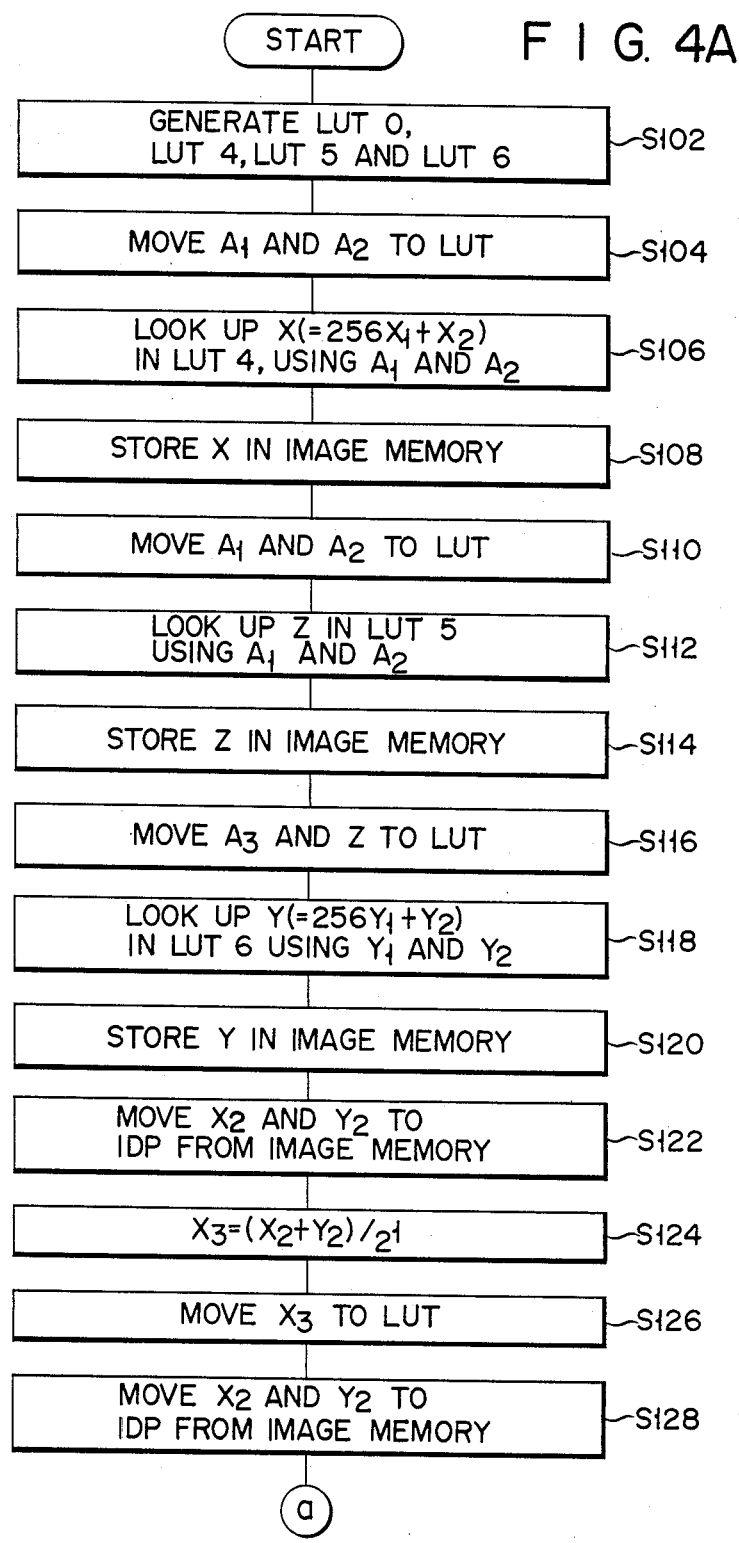
FIGS. 4A and 4B are flowcharts for dividing 16-bit image data with a designated integer.
Figure 4B:
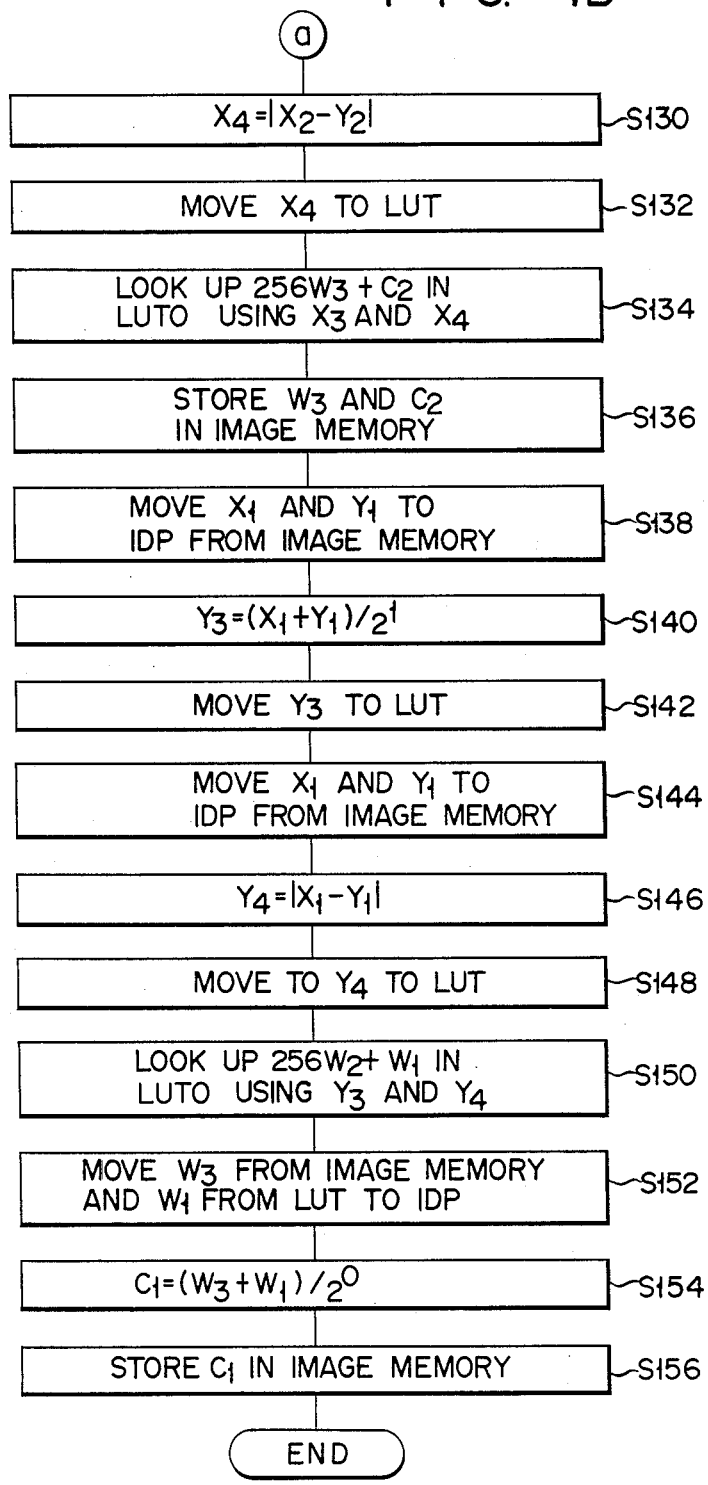
Figure 5:
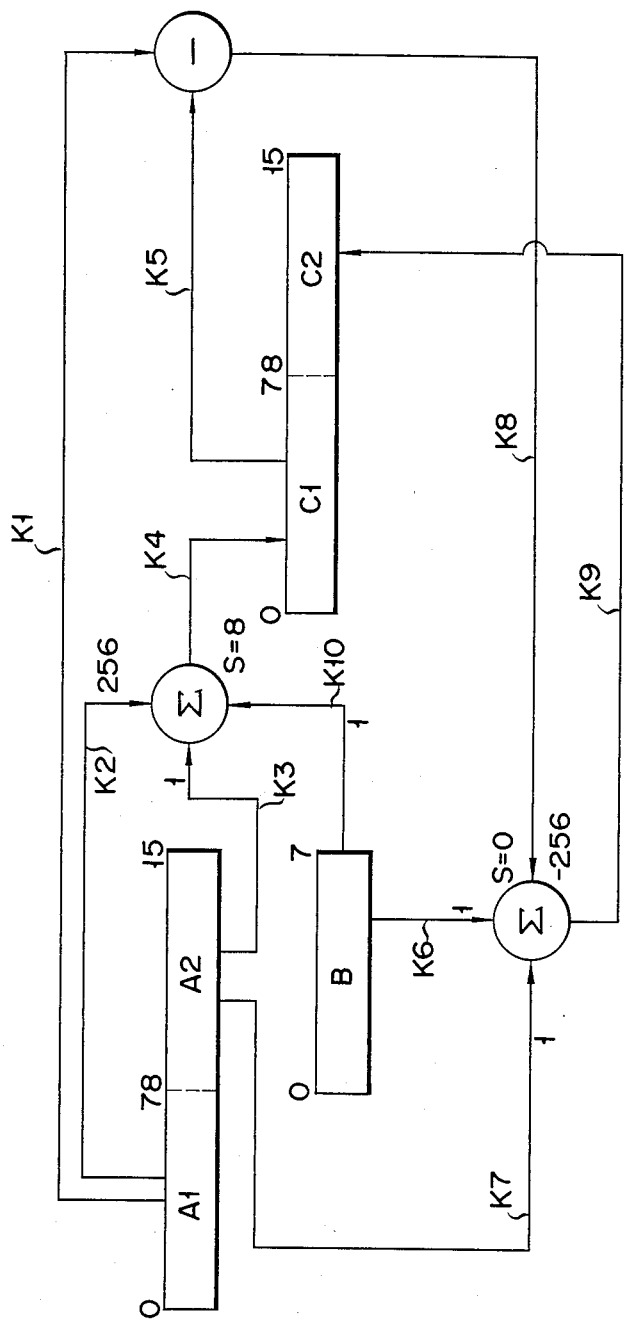
FIG. 5 is a data flow when the flowchart shown in FIG. 2A is executed.
Figure 6:
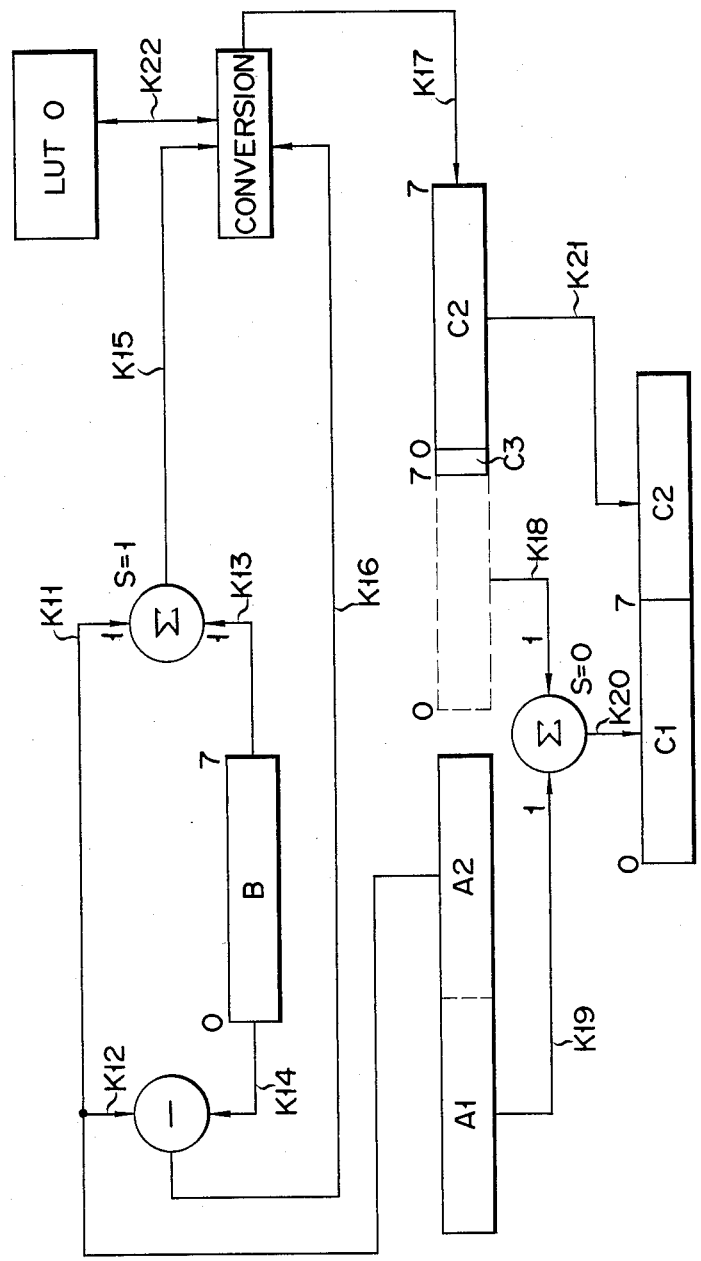
FIG. 6 is a data flow when the 16-bit addition shown in FIG. 2B is executed.
Figure 7:
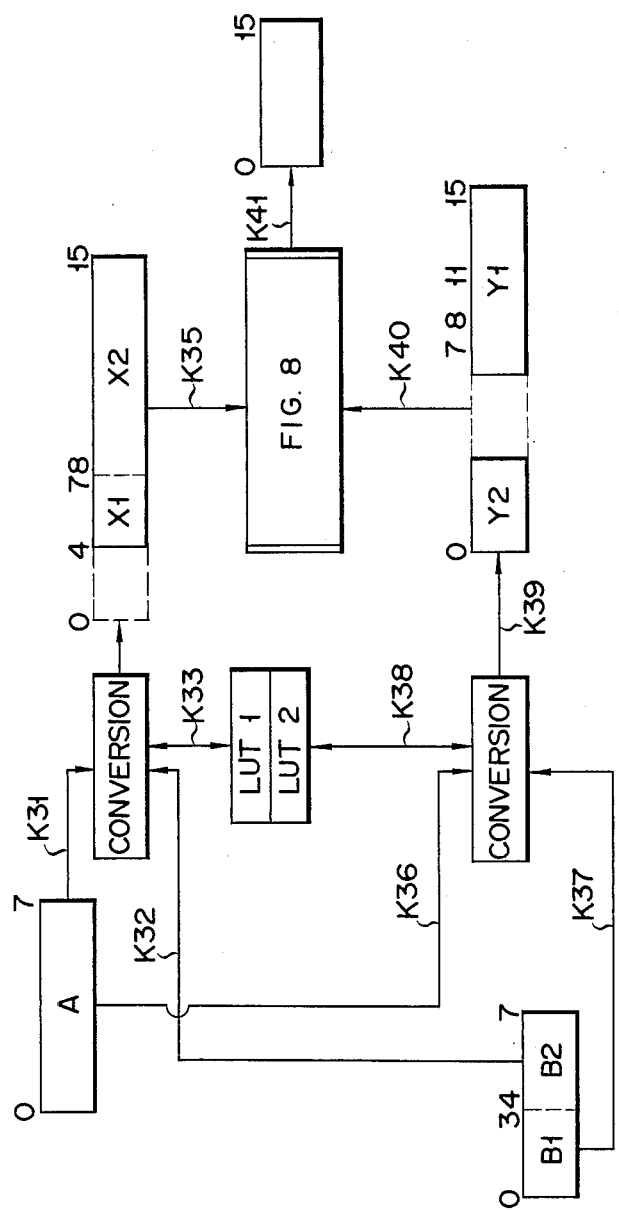
FIGS. 7 and 8 are data flows when 16-bit multiplication shown in FIG. 3 is executed.
Figure 8:
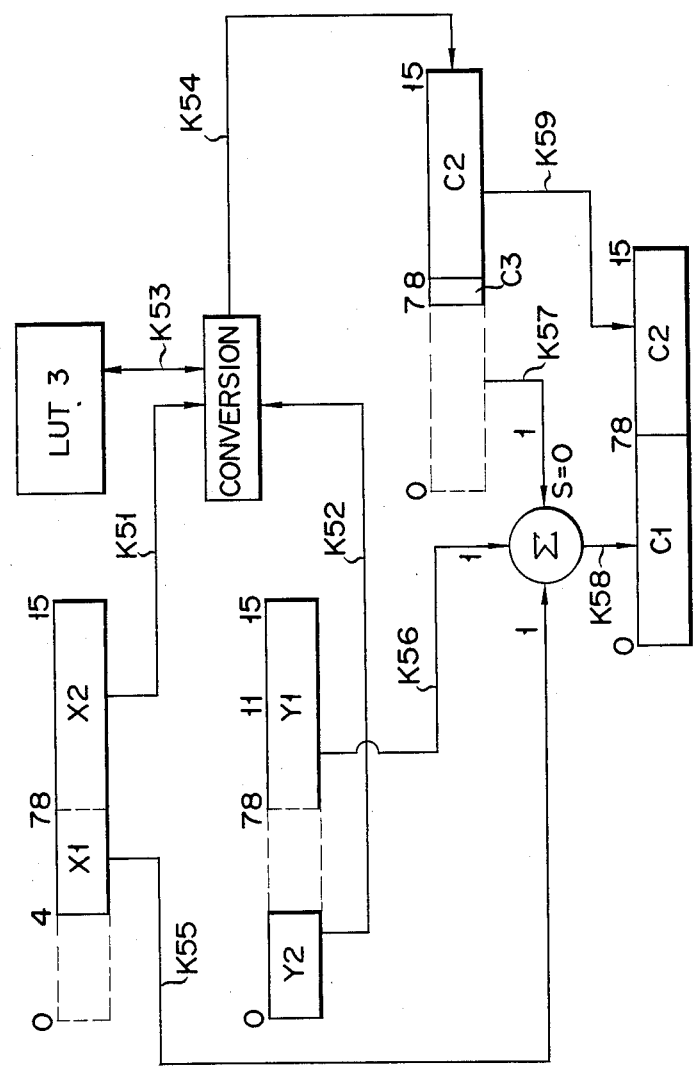
Figure 9:
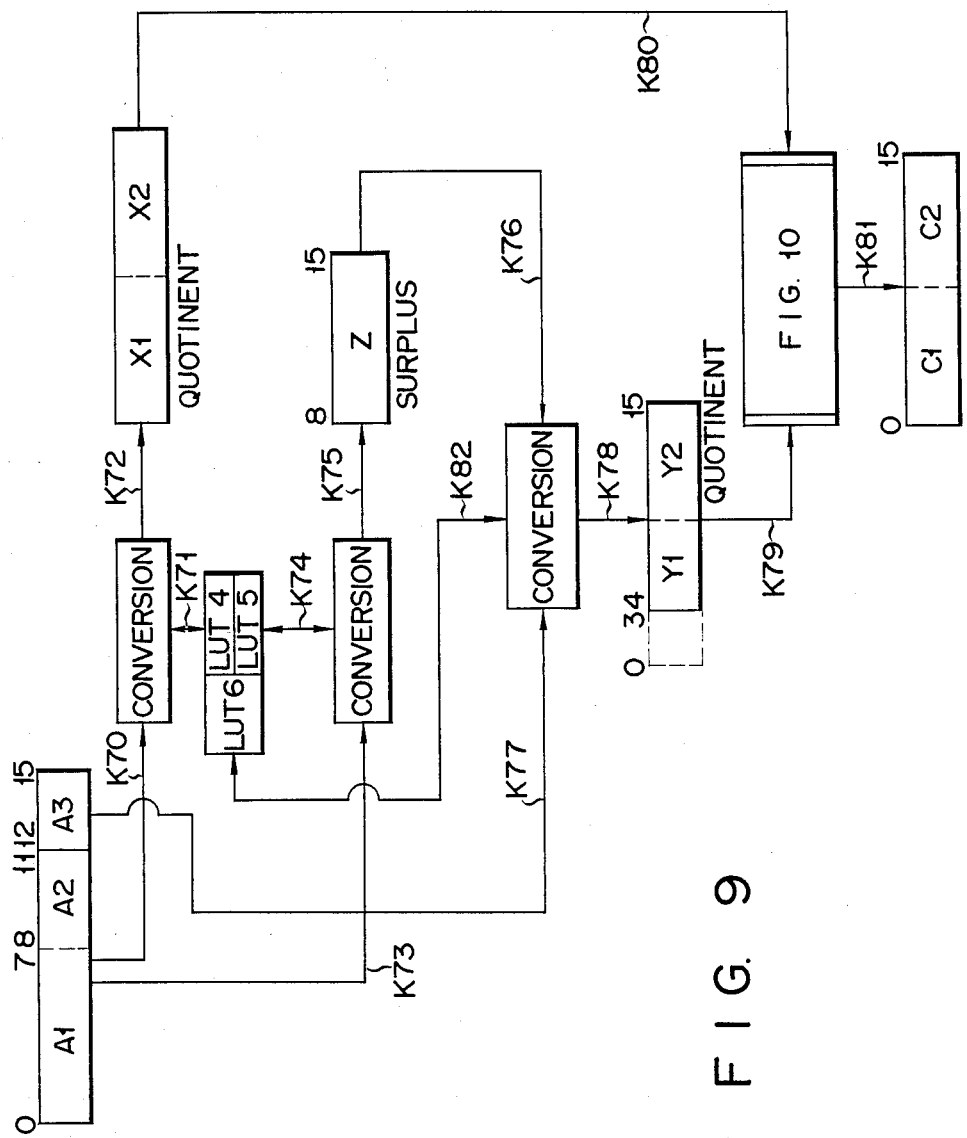
FIGS. 9 and 10 are data flows when 16-bit division shown in FIGS. 4A and 4B is executed.
Figure 10:
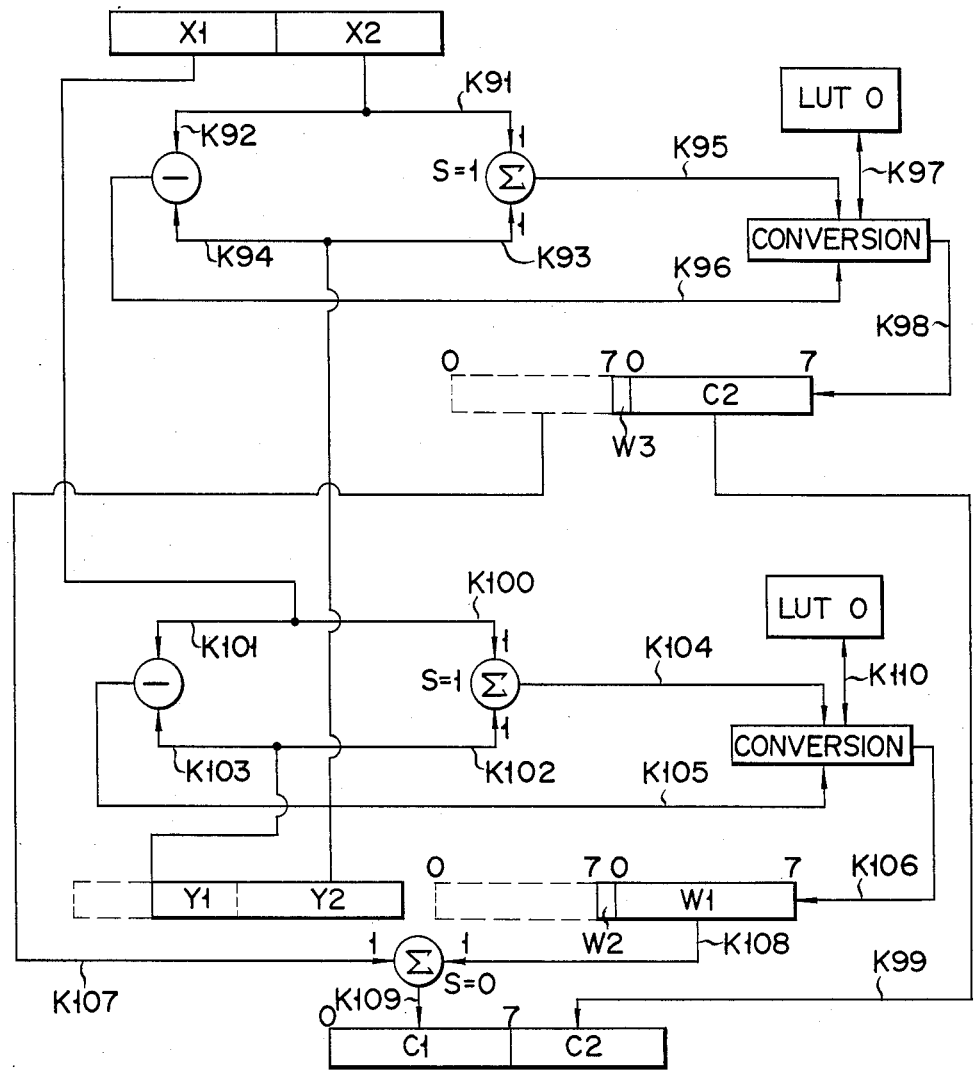

(3) 16-bit division of 16-bit image data÷N (a specified positive integer below 255) will now be described with reference to the flowchart shown in FIGS. 4A and 4B.

Assume that operation image data A (256A1+A2) is stored in image memories 11-1 and 11-2, and the operation result is stored in image memories 11-3 and 11-4. Specified integer N is 160 in decimal notation and is 1011 0000 in binary notation.

In step S102, controller 15 causes LUT 18 to generate tables LUT0, LUT4, LUT5, and LUT6 in response to a 16-bit division command from the external circuit. More specifically, controller 15 supplies a table 0 generation command, a table 4 generation command, a table 5 generation command, and a table 6 generation command to table generator 13. Table generator 13 generates tables LUT0, LUT4, LUT5, and LUT6 in response to these commands, and stores them in table memory 17.

Controller 15 supplies a table 4 conversion command to conversion processor 14. Subsequently, controller 15 accesses image memories 11-1 and 11-2 in step S104 to transfer operation image data A to conversion processor 14, as indicated by arrow K70 in FIG. 9.

If upper 8-bits of data A are given by A1 and lower 8-bits thereof are given by 16A2+A3, A÷N can be expressed by:

$$A \div N = \{(\text{quotient of } (256A1 + 16A2) \div N\} + \qquad (3)$$
$$\{\text{quotient of [remainder of }((256A1 + 16A2) \div N)A3] \div N\}$$

In this embodiment, a 16-bit division is made in accordance with relation (3).

In step S106, conversion processor 14 executes conversion processing using data conversion table LUT4 by substituting data 16A1+A2 for data I, as indicated by arrow K71, in order to obtain quotient X (=256X1+X2) obtained by dividing upper 12 bits (256A1+16A2) of 16-bit image data A with constant N (N is a positive integer below 255; in this embodiment, N=160).

In this embodiment, quotient X (=256X1+X2) obtained by dividing (256A1+16A2) with N is registered in advance at address I of table LUT4, as indicated by the following relation:

$$LUT4(I) = (16 \text{ bits of } [(256A1+16A2)/N])$$

where [ ] are Gaussian symbols.

For example, if image data A is "1010 1101 0010 0101" and constant N is 160 (=1011 0000), 16-bit data "0000 0000 1111 1011" can be obtained, as shown in FIG. 15.

Data X obtained in step S106 is stored in image memories 11-1 and 11-2 in step S108, as indicated by arrow K72.

In step S110, controller 15 supplies a table 5 conversion command to conversion processor 14 in order to obtain remainder Z obtained by dividing upper 12 bits (256A1+16A2) of 16-bit image data A with N. Thereafter, controller 15 accesses image memories 11-1 and 11-2 to read out image data A, and transfers it to conversion processor 14, as indicated by arrow K73.

In step S112, processor 14 derives (256A1+16A2) from input image data A in the same manner when it looks up table LUT4, and executes data conversion using table LUT5 by substituting it for data I. In this embodiment, remainder Z (8 bits) obtained by dividing image data (256A1+16A2) with constant N is registered in advance at address I of table LUT5, as indicated by the following relation:

$$LUT5(I) = Z = \text{remainder of } (256A1+16A2)/N$$

For example, if image data A is "1010 1101 0010 0101" and constant N is "1011 0000", data Z "0000 0000 1001 0000" can be obtained as a conversion result, as shown in FIG. 16. In step S114, controller 15 stores result Z in memory 11-1.

Controller 15 supplies a table 6 conversion command to conversion processor 14 in order to obtain quotient Y (12 bits) obtained by dividing a sum of lower 4 bits A3 of 16-bit image data A and remainder Z. In step S116, controller 15 accesses image memories 11-1 and 11-2 to read out data Z and A3 and transfers them to conversion processor 14, as indicated by arrows K76 and K77.

In step S118, upon reception of these data in response to the command, processor 14 executes data conversion using table LUT6 by substituting combination data of data A3 and Z for single data I ($=256A3+Z$), as indicated by arrow K82. In this embodiment, 12-bit quotient Y ($=256Y1+Y2$) obtained by dividing the sum of A3 and remainder Z with constant N is registered in advance at address I of table LUT6, as shown in FIG. 17, as indicated by the following relation:

$$LUT6(I)=Y=[(A3+Z/N]$$

where $I=256A3+Z$

For example, if data Z is "1010 1100" and data A3 is "0101", data I is "0101 1010 1100", and data Y of "0000 0000 0000 0001" can be obtained as the conversion result.

Therefore, when conversion processor 14 accesses table LUT6 with reference to 12-bit data I ($256A3+Z$), quotient Y (12 bits) can be obtained.

In step S120, controller 15 stores data Y in image memories 11-1 and 11-2, as indicated by arrow K79.

Subsequently, a 16-bit addition of data X and Y is made by executing twice the same processing as the 16-bit addition processing shown in FIG. 2B.

In step S122, controller 15 outputs a linear combination command, so that combination coefficients for data X2 and Y2 are respectively 1 and shift bit number S is 1. Controller 15 reads out data X2 and Y2 from image memory 11-2, and transfers them to IDP 12, as indicated by arrows 91 and 93. Upon reception of the operation data in response to the linear combination command, IDP 12 executes the linear combination operation to obtain data X3 in step S124. IDP 12 transfers resultant data X3 to processor 14 in step S126.

Controller 15 supplies a difference absolute value operation command to IDP 12. Controller 15 accesses image memory 11-2 again to read out data X2 and Y2 and transfers them to IDP 12, as indicated by arrows K92 and K94. In step S130, IDP 12 calculates absolute value X4 of the difference of input data. Difference X4 is transferred to processor 14 of LUT 18, in step S132, as indicated by arrow K96. In this case, a table 0 conversion command has been generated for processor 14. In response to this, processor 14 looks up table LUT0 to obtain data ($256W3+C2$), as indicated by arrow K97. In this case, table LUT0 is the same as that shown in FIG. 11.

Converted data ($256W3+C2$) is stored in image memories 11-1 and 11-4, in step S136, as indicated by arrows K98.

Controller 15 then outputs a linear combination command, so that combination coefficients for data X1 and Y1 are respectively 1, and shift bit number S is 1. In step S138, controller 15 accesses image memory 11-1 to read out data X1 and Y1 and transfers them to IDP 12, as indicated by arrows K100 and K102. Upon reception of operation data, IDP 12 executes the linear combination operation in step S140, and resultant data Y3 is transferred to processor 14 in step S142.

Controller 14 outputs a difference absolute value operation command to IDP 12. In step S144, controller 15 accesses image memory 11-1 again to read out data X1 and Y1, and transfers them to IDP 12, as indicated by arrows K101 and K103.

In step S146, IDP 12 calculates absolute value Y4 of the difference between input data X1 and Y1, and resultant data Y4 is transferred to processor 14, in step S148, as indicated by arrow K105. In this case, a table 0 conversion command has been generated for processor 14. Upon reception of data Y3 and Y4, processor 14 obtains data ($256W2+W1$) by looking up table LUT0 in response to the command, in step S150, as indicated by arrow K110. In this case, if W2 is "1", this means "overflow". Therefore, normally, W2 is "0".

In step S152, controller 15 outputs a linear combination command to IDP 12, so that a coefficient for data W1 is 1, a coefficient for data W3 is 1, and shift bit number S is 0. Controller 15 reads out data W1 from processor 14, and transfers it to IDP 12. In addition, controller 15 reads out data W3 from image memory 11-1 and transfers it to IDP 12. In step S154, upon reception of these data, IDP 12 executes the linear combination processing of data W1 and W3 in response to the command to obtain data C1, in step S154. Data C1 is stored in image memory 11-3, in step S156.

In this manner, a 16-bit division is executed.

In this embodiment, the processor functions of 16-bit addition, 16-bit multiplication, and 16-bit division have been described. However, for example, a comparison processor function for comparing identical pixels of 8-bit image data A and B (i.e., a function for outputting smaller or larger data) can be realized. This can be easily realized by combining the difference absolute value operation function and the linear combination operation function provided to image data processor 12 by utilizing the following formulas:

$$max(A, B) = (A + B + |A - B|)/2 \text{ and}$$

$$min(A, B) = (A + B - |A - B|)/2$$

For example, in the case of max(A,B), a difference absolute value operation command is output to image data processor 12, and data A and B are read out from image memories 11-1 and 11-2 to be supplied thereto. After the difference absolute value operation, a linear combination command is generated, so that coefficients for data A, B, and $|A-B|$ are respectively 1, and shift bit number S is 0, and data A and B are again supplied to processor 12. Thus, processor 12 executes linear combination processing, to obtain max(A,B). In the case of min(A,B), the same operation except that a coefficient for $|A-B|$ is set to be $-1$ is performed.

In this embodiment, a case has been described wherein conversion processor 14 having a 12-bit address and a 16-bit output is used. However, the output can be limited to 12 bits. In this case, only table LUT4 poses a problem. Therefore, this problem can be solved by dividing table LUT4 into two tables, and two tables can be looked up.

In this embodiment, a 16-bit image data operation processing apparatus has been described. However, if a 2n-bit memory is constituted by two n-bit image memories, when n-bit image data processor is used instead of 8-bit image data processor 12 and an m-bit data conversion processor (m is an integer satisfying $3n/2 \leq m < 2n$) instead of a 12-bit data conversion processor, a 2n-bit image data operation processing apparatus can be realized.

Figure 18:
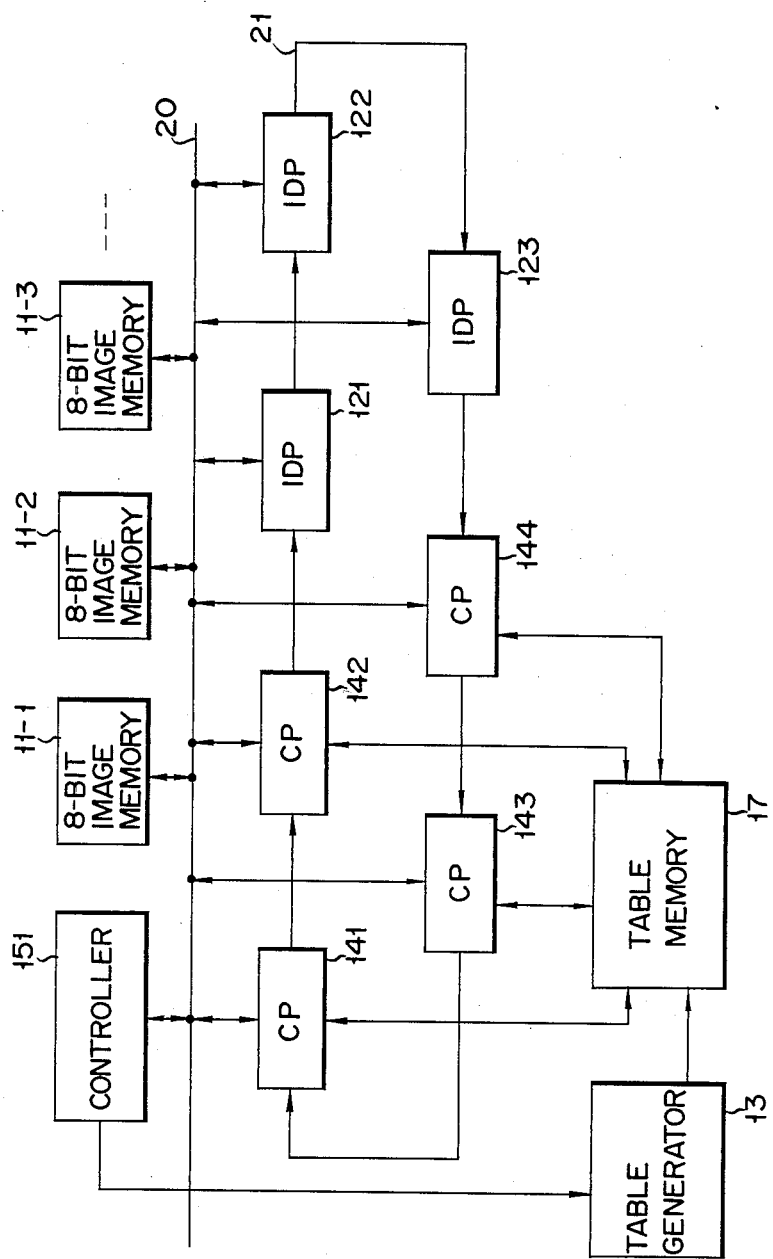
FIG. 18 is a block diagram of an image data operation processing apparatus according to another embodiment of the present invention.

An image data operation processing apparatus according to another embodiment of the present invention will now be described with reference to FIG. 18.

8-bit image memories 11-1, 11-2, 11-3, ..., conversion processors (CPs) 141 to 144, and image data processors (IDPs) 121 to 123 are connected to controller 151 through system bus 20, in the same manner as in the above embodiment. Table generator 13 generates various tables, e.g., above-mentioned tables LUT0 to LUT6, upon instruction from controller 151, and stores the table data in table memory 17. Table memory 17 is looked up by CPs 141 to 144 in the same manner as in the above embodiment.

Each of CPs 141 to 144 and IDPs 121 to 123 has a pair of data input and output devices, unlike CP 14 and IDP 12. The input device of each of CPs 141 to 144 is connected to the output device of an adjacent one through annular data bus 21. CPs 141 to 144 fetch data from controller 151 through system bus 20 in response to a data input command from controller 151, and outputs data held therein to controller 151 in response to a data output command from controller 151.

CPs 141 to 144 fetch data from annular data bus 21 in response to a data bus input command from controller 151, and execute data conversion processing. The processed data is output onto bus 21 in accordance with a data output command from controller 151. If there is no command from controller 151, data input through bus 21 is output directly thereonto. Other functions of CPs 141 to 144 are the same as those of CP 14.

As for IDPs 121 to 123, the same functions as those of CPs 141 to 144 are provided.

The operation will be described with reference to FIGS. 5 to 10 since the basic operation of this embodiment is substantially the same as that described with reference to the data flows shown therein.

First, a 16-bit addition will be described.

Controller 151 outputs a linear combination command to IDP 121 and outputs a subtraction command, i.e., a type of linear combination command, to IDP 122. The linear combination command output to IDP 121 sets a coefficient for data A1 to be 256, a coefficient for data A2 to be 1, a coefficient for data B to be 1, and a shift bit number to be 8. The linear combination command to IDP 122 sets a coefficient for data C1 to be 1, a coefficient for data A1 to be −1, and a shift bit number to be 0.

Controller 151 outputs a linear combination command to IDP 123, so that a coefficient for data A2 is 1, and a coefficient for data B is 1, a coefficient for data X is −256, and a shift bit number is 0.

Controller 151 outputs the data input command to IDPs 121 to 123. Controller 151 also outputs data A1, A2, and B onto system bus 20. Output data A1, A2, and B are fetched by IDP 121, and data A2 is also fetched by IDP 122. Data A2 and B are also fetched by IDP 123.

Upon reception of operation data, IDP 121 executes linear combination processing in accordance with the linear combination command to obtain data C1. After the linear combination processing by IDP 121 is completed, controller 151 outputs a data bus input command to IDP 122 and, thereafter, outputs a data output command and a data bus output command to IDP 121. IDP 121 outputs data C1 as the linear combination processing result to controller 151 through bus 20 and, at the same time, outputs it to IDP 122 through annular data bus 21.

Upon reception of data C1 through bus 20, controller 151 stores it in image memory 11-4. At the same time, when IDP 122 receives data C1 through bus 21, it executes linear combination processing. Resultant data X is output onto bus 21 in accordance with the data bus output command from controller 151.

At this time, IDP 123 has received the data bus input command from controller 151 prior to that for IDP 122.

When IDP 123 receives data X through bus 21, it executes linear combination processing using data A2 and B held therein in accordance with the linear combination command. After the processing, IDP 123 outputs the operation result to controller 151 through bus 20. Controller 151 stores the operation result in image memory 11-5. In this manner, a 16-bit addition is executed. Alternatively, the 16-bit addition can also be executed as follows.

Controller 151 generates a table 0 generation command in response to the 16-bit addition command and supplies it to table generator 13. Generator 13 generates table LUT0, and stores it in table memory 17.

Upon reception of the 16-bit addition command, controller 151 outputs the linear combination command to IDP 121, a difference absolute value operation command to IDP 122, and a table 0 conversion command to CP 142. In addition, controller 151 outputs the linear combination command to IDP 123. The linear combination command for IDP 121 sets a coefficient for data A2 to be 1, a coefficient for data B to be 1, and a shift bit number to be 1. The linear combination command for IDP 123 sets coefficients for data A1 and C3 to be 1, respectively, and a shift bit number to be 0.

Controller 151 outputs a data input command to IDPs 121 to 123, and outputs data A1, A2, and B onto bus 20. Data A2 and B are fetched by IDPs 121 and 122, and data A is fetched by IDP 123. IDP 121 executes linear combination processing in accordance with the input linear combination command, and IDP 122 executes a difference absolute value operation upon reception of data. IDPs 121 and 122 in turn output the operation results onto bus 21 in accordance with the data bus output command from controller 151.

CP 142 fetches data in accordance with the data bus input command from controller 151, and obtains data (256C3+C2) by looking up table LUT0 in accordance with the table 0 conversion command.

At this time, IDP 123 has already received the linear combination command from controller 151 and, then receives the data bus input command from controller 151.

After the processing, CP 142 outputs data C2 onto bus 20 in accordance with the data output command and data C3 onto bus 21 in accordance with the data bus output command, from controller 151. IDP 123 receives data C3 from bus 21 in accordance with the data bus input command. Upon reception of the data, IDP 123 executes linear combination processing in accordance with the linear combination command. Resultant data C1 is output onto bus 20 in accordance with the data output command from controller 151, and is stored in image memory 11-3. In this manner, the 16-bit addition is executed.

Execution of a 16-bit multiplication command will be described.

Controller 151 outputs a table 1 generation command, a table 2 generation command, and a table 3 generation command to table generator 13. Generator 13 generates tables LUT1, LUT2, and LUT3 in accordance with the input commands, and writes them in table memory 17.

Controller 151 then outputs a table 1 conversion command to CP 143, a table 2 conversion command to CP 144, a table 3 conversion command to CP 141, and a linear combination command to IDP 121. The linear combination command sets a coefficient for data X1 to be 1, a coefficient for data Y1 to be 1, a coefficient for data C3 to be 1, and a shift bit number to be 0.

Controller 151 outputs the data input commands and data A and B ($=16B1+B2$) to CPs 143 and 144. Upon reception of the data, CP 143 calculates data X ($=256X1+X2$) by looking up table LUT1 in accordance with the table 1 conversion command. When CP 144 receives the data, it calculates data Y ($=4096Y2+Y1$) by looking up table LUT2 in accordance with the table 2 conversion command.

Controller 151 outputs the data bus input command to CP 141, and sequentially outputs the data bus output command to CPs 143 and 144. CPs 143 and 144 respectively output data X2 and Y2 onto bus 21, and these data are input to CP 141. When CP 141 receives the data, it looks up table LUT3 in accordance with the table 3 conversion command to obtain data ($256C3+C2$).

Controller 151 outputs the data output command to CP 141, data C2 to bus 20, and the data bus input command to IDP 121. Data C2 is stored in image memory 11-4 by controller 151.

Controller 151 sequentially outputs the data bus output command to CPs 143, 144 and 141. CPs 143, 144, and 141 respectively output data X1, Y1, and C3 onto data bus 21 in accordance with the command, and these data are fetched by IDP 121.

When IDP 121 fetches the data, it executes the linear combination processing in accordance with the linear combination command to obtain data C1. After the processing, controller 151 outputs the data output command to IDP 121. IDP 121 outputs data C1 onto bus 20 in accordance with the command, and controller 151 stores the output data in image memory 11-3. In this manner, the 16-bit multiplication is executed.

A 16-bit division will now be described.

Controller 151 outputs a table 0 generation command, a table 4 generation command, a table 5 generation command, and a table 6 generation command to table generator 13. Generator 13 generates tables LUT0, LUT4, LUT5, and LUT6 in accordance with the input commands, and stores them in table memory 17.

Controller 151 outputs a table 4 conversion command to CP 141, a table 5 conversion command to CP 142, a table 6 conversion command to CP 143, and a table 0 conversion command to CP 144. In addition, controller 151 outputs a linear combination coefficient so that coefficients for two input data are respectively 1 and a shift bit number is 1, and outputs a difference absolute value operation command to IDP 122. Controller 151 supplies a linear combination command to IDP 123 so that coefficients for two input data are respectively 1 and a shift bit number is 0.

Controller 151 outputs the data input command and data A ($=256A1+16 A2+A3$) read out from image memories 11-1 and 11-2 to CPs 141, 142 and 143. CPs 141 and 142 fetch data A1 and A2, and CP 143 fetches data A3.

Upon reception of the data, CP 141 looks up table LUT4 in accordance with the table 4 conversion command to obtain data X ($=256X1+X2$). CP 142 looks up table LUT5 in accordance with the table 5 conversion command to obtain data Z.

Controller 151 outputs the data bus input command to CP 143, and outputs the data bus output command to CP 142 after its processing is completed. Resultant data Z is output from CP 142 onto bus 21 in response to the command, and is fetched by CP 143.

When CP 143 fetches the data, it looks up table LUT6 in accordance with the table 6 conversion command to obtain data Y ($=256Y1+Y2$).

Controller 151 outputs the data bus input command to IDPs 121 and 122, and outputs the data bus output commands to CPs 141 and 143. In response to these commands, data X2 and Y2 are fetched by IDPs 121 and 122.

IDP 121 executes linear combination processing in accordance with the linear combination command to obtain data X3. IDP 122 executes a difference absolute value operation in accordance with the difference absolute value operation command, thereby obtaining data X4. Controller 151 outputs the data bus input command to CP 141 and the data bus output command to IDPs 121 and 122. In response to these commands, linear combination processing result X3 and difference absolute value processing result X4 are fetched by CP 144. CP 144 looks up table LUT0 in accordance with the table 0 conversion command, thus obtaining data ($256W3+C2$).

At the same time, controller 151 outputs the data bus input command to IDPs 121 and 122 and outputs the data bus output command to CPs 141 and 143, in the same manner as described above. CPs 141 and 143 respectively output data X1 and Y1 onto bus 21 and a combination of data X1 and Y1 is fetched by IDPs 121 and 122. IDP 121 executes linear combination processing in the same manner as described above, thereby obtaining data Y3. IDP 122 executes difference absolute value operation processing to obtain data Y4.

Controller 151 outputs the data bus input command to IDP 123, and outputs the data output command and the data bus output command to CP 144. CP 144 outputs data C2 onto bus 20, and outputs data W3 onto bus 21. When controller 151 receives data C2, it stores it in image memory 11-4. Data W3 is fetched by IDP 123.

Thereafter, controller 151 outputs the data bus input command to CP 144, and outputs the data bus output command to IDPs 121 and 122. In response to this command, CP 144 receives linear combination processing result Y3 and absolute operation result Y4 for the second time, and looks up table LUT0 in accordance with the table 0 conversion command, thereby obtaining data ($W2+W1$).

When the data bus output command is supplied to CP 144 from controller 151, data W1 is fetched by IDP 123.

IDP 123 executes linear combination processing of previously input data W3 and data W1 in accordance with the linear combination command, thereby obtaining data C1. Controller 151 outputs the data output command to IDP 123. IDP 123 outputs data C1 onto bus 20 in response to the command. Controller 151 receives the data and stores it in image memory 11-3. In this manner, the 16-bit division is executed.

In the above description, a case has been described wherein CPs 141 to 144 and IDPs 121 to 123 are connected through the annular data bus. In this case, the conversion processors or image data processors receive data from the annular data bus in response to the data bus input command and the data bus output command. However, they can automatically and sequentially receive data in accordance with a conversion command or a linear combination command.

Figure 19:
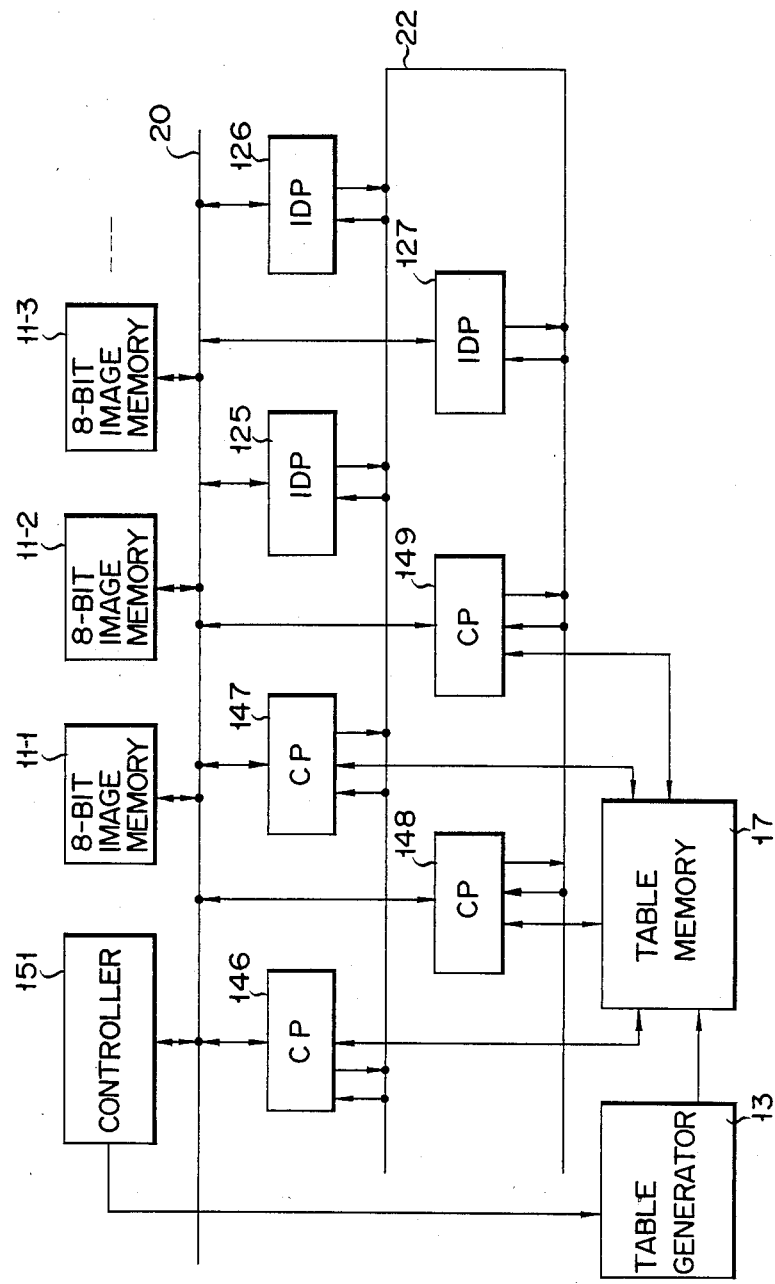
FIG. 19 is a block diagram of an image data operation processing apparatus according to still another embodiment of the present invention.

In the above description, if there is no command from controller 151, CPs 141 to 144 or IDPs 121 to 123 directly output data input to their input devices connected to the annular data bus from their output devices. However, even if such a means is not provided, if the input and output devices are provided, CPs 141 to 144 or IDPs 121 to 123 are connected to data bus 22 corresponding to the annular data bus in addition to the system bus, as shown in FIG. 19, so that the same operation processing as that in the embodiment shown in FIG. 18 can be executed.

What is claimed is:

1. An image data operation processing apparatus for executing 2n-bit operations, n being a positive even integer, between image data stored in image memories, comprising:

linear operation means, responsive to an input linear combination command, for linearly combining K input n-bit to-be-combined data, K being an integer $\geq 2$, to generate n-bit linearly combined data indicated by the following relation, $$C = \left( \sum_{i=1}^{K} a_i A_i + b \right) / 2^S$$

where $A_i$ is input ith n-bit to-be-combined data, $a_i$ is a coefficient for $A_i$, b is a bias number, S is a shift bit number, and C is the n-bit linearly combined data;

table storing means, having conversion tables, for outputting conversion data in accordance with input address data;

data conversion means, responsive to an input data conversion command, for generating and outputting to said table storing means the input address data in a predetermined format from input to-be-converted data to obtain the conversion data, wherein the number of bits of the to-be-converted data does not exceed m bits, m being an integer satisfying the equation $3n/2 \leq m < 2n$; and operation control means, responsive to an input operation instruction, for successively and selectively generating one of the linear combination command and the data conversion command, for outputting to said linear operation means the linear combination command and the K n-bit to-be-combined data read from the image memories in accordance with the linear combination command, for outputting to said data conversion means the data conversion command and the to-be-converted data read from said image memories in accordance with the data conversion command, an for receiving the n-bit linearly combined data from said linear operation means and the conversion data from said data conversion means to store the received data in said image memories.

2. The apparatus according to claim 1, wherein said table storing means comprises a ROM.

3. The apparatus according to claim 1, wherein said table storing means comprises a RAM, said operation control means includes means for generating a table generation command in accordance with the operation instruction, and said apparatus further comprises table generation means for generating the conversion tables in response to the table generation command from said operation control means to store the generated tables in said table storing means.

4. The apparatus according to claim 1, wherein the operation instruction is a 2n-bit addition instruction for obtaining 2n-bit resultant data from 2n-bit image data and n-bit image data stored in said image memories, and wherein said operation control means includes:

means for generating a first linear combination command to obtain first linearly combined data as upper n-bit resultant data of the 2n-bit resultant data wherein the coefficient for the upper n-bit image data of the 2n-bit image data of the to-be-combined data is $2^n$, the coefficient for lower n-bit image data of the 2n-bit image data of the to-be-combined data is 1, the coefficient for the n-bit image data of the to-be-combined data is 1, other coefficients and the bias number are 0, and the shift bit number is n; for generating a second linear combination command to obtain second linearly combined data, wherein the coefficient for the first linearly combined data is 1, the coefficient for the upper n-bit image data is $-1$, other coefficient and the bias number are 0, and the shift bit number is 0; and for generating a third linear combination command to obtain third linearly combined data as lower n-bit resultant data of the 2n-bit resultant data wherein the coefficient for the second linearly combined data is $-2^n$, the coefficient for the lower n-bit image data is 1, the coefficient for the n-bit image data is 1, other coefficients and the bias number are 0, and the shift bit number is 0.

5. The apparatus according to claim 1, wherein the operation instruction is a multiplication instruction for obtaining 2n-bit resultant data from first and second n-bit image data stored in said image memories, and wherein said table storing means includes:

first table storing means, having a first table as one of the conversion tables, for outputting as the conversion data first table conversion data representing first multiplication results of first n-bit to-be-converted data by first n/2-bit to-be-converted data in accordance with input first table address data as the address data;

second table storing means, having a second table as one of the conversion tables, for outputting as the conversion data second table conversion data representing second multiplication results of second n-bit to-be-converted data by second n/2-bit to-be-converted data in accordance with input second table address data as the address data; and third table storing means, a having a third table as one of the conversion tables, for outputting as the conversion data third table conversion data representing addition results of third n-bit to-be-converted data to third n/2-bit to-be-converted data in accordance with input third table address data as the address data, said data conversion means includes:

first table conversion means, responsive to an input first data conversion command as the data conversion command, for generating the first table address data from the input first n-bit to-be-converted data and the input first n/2-bit to-be-converted data to obtain the first table conversion data;

second table conversion means, responsive to an input second data conversion command as the data conversion command, for generating the second table address data from the second input n-bit to-be-converted data and the second input n/2-bit to-be-converted data to obtain the second table conversion data; and third table conversion means, responsive to an input third data conversion command as the data conversion command, for generating the third table address from the input third n-bit to-be-converted data and the second input n/2-bit to-be-converted data to obtain the third table conversion data, and said operation control means includes:
means for generating the first table conversion command for the first n-bit image data and lower n/2-bit image data of the second n-bit image data; for generating the second table conversion command for the first n-bit image data and lower n/2-bit image data of the second n-bit image data; for generating the third table conversion command for lower n-bit conversion data of the first table conversion data and lower n/2-bit conversion data of the second table conversion data as lower n-bit resultant data of the n/2-bit resultant data; and for generating the linear combination command to obtain fourth linearly combined data as upper n-bit resultant data of the 2n-bit resultant data, wherein the coefficient for upper n/2-bit conversion data of the first table conversion data is 1, the coefficient for upper n-bit conversion data of the second table conversion data is 1, the coefficient for upper 1-bit conversion data of the third table conversion data is 1, other coefficients and the bias number are 0, and the shift bit number is 0.

6. The apparatus according to claim 1, wherein said linear operations means further comprises means, responsive to an input difference absolute value operation command, for calculating absolute value data of a difference between two input n-bit to-be-converted data, and said operation control means further comprises means, responsive to the input operation instruction, for selectively generating the difference absolute value operation command, for outputting to said linear operation means the generated command and the two n-bit to-be-converted data read from said image memories in accordance with the generated command, and for receiving the absolute value data from said linear operation means to store the receives data in said image memories.

7. The apparatus according to claim 6, wherein the operation instruction is a 2n-bit addition command for obtaining 2n-bit resultant data from 2n-bit image data and n-bit image data stored in said image memories, said table storing means includes fourth table storing means, having a fourth table as one of the data conversion tables, for outputting as the conversion data fourth table conversion data representing addition results of 2x (fourth n-bit to-be-converted data) to fourth 1-bit to-be-converted data in accordance with input fourth table address data as the address data, said data conversion means comprises fourth table conversion means, responsive to an input fourth data conversion command, for generating the fourth table address data from the input fourth n-bit to-be-converted data and the input fourth 1-bit to-be-converted data to obtain the fourth table conversion data, and said operation control means includes:
means for generating a linear combination command to obtain fifth linearly combined data wherein the coefficient for lower n-bit image data of the 2n-bit image data is 1, the coefficient for the n-bit image data is 1, other coefficients and the bias number area, and the shift bit number is 1; for generating the difference absolute value operation command for the lower n-bit image data and the n-bit image data to obtain first absolute value data; for generating a fourth table conversion command for the fifth linearly combined data and lowermost 1-bit data of the first absolute value data to obtain the fourth table conversion data, lower n-bit conversion data of the fourth table conversion data being lower n-bit resultant data of the 2n-bit resultant data; and for generating the linear combination command to obtain sixth linearly combined data as upper n-bit resultant data of the 2n-bit resultant data, wherein the coefficient for upper n-bit image data of the 2n-bit image data is 1, the coefficient for uppermost 1-bit conversion data of the fourth table conversion data is 1, other coefficients and the bias number are 0, and the shift bit number is 0.

8. The apparatus according to claim 1, wherein the operation instruction is a division instruction for dividing 2n-bit image data stored in said image memories with a designated integer less than 2n−1 to obtain 2n-bit resultant data, said table storing means includes:
fifth table storing means having a fifth table as one of the conversion tables for outputting as the conversion data fifth table conversion data representing quotients of fifth 3n/2-bit to-be-converted data in accordance with input fifth table address data as the address data;

sixth table storing means having a sixth table as one of the conversion tables for outputting as the conversion data sixth table conversion data representing surpluses of sixth 3n/2-bit to-be-converted data in accordance with input sixth table address data as the address data;

seventh table storing means having a seventh table as one of the conversion tables for outputting as the conversion data seventh table conversion data representing quotients of a sum of seventh n/2-bit to-be-converted data and the sixth table conversion data in accordance with input seventh table address data as the address data; and eighth table storing means having an eighth table as one of the conversion tables for outputting as the conversion data eighth table conversion data representing addition results of 2x (eighth n-bit to-be-converted data) to eighth 1-bit to-be-converted data in accordance with input eighth table address data as the address data, said data conversion means includes:

fifth table conversion means, responsive to an input fifth table conversion command as the data conversion command, for generating the fifth table address data from the input fifth 3n/2-bit to-be-converted data to obtain the fifth table conversion data;

sixth table conversion means responsive to an input sixth table conversion command as the data conversion command, for generating the sixth table address data from the input sixth 3n/2n-bit to-be-converted data to obtain the sixth table conversion data;

seventh table conversion means, responsive to an input seventh table conversion command as the data conversion command, for generating the seventh table address data from the input seventh n/2-bit to-be-converted data and the input sixth table conversion data to obtain the seventh table conversion data; and eighth table conversion means, responsive to an input eighth table conversion command as the data conversion command, for generating the eighth table address data from the input eight n-bit to-be-converted data and the input eighth 1-bit to-be-converted data to obtain the eighth conversion data, and said operation control means includes:

means for generating the fifth table conversion command for upper 3n/2-bit image data of the 2n-bit image data to obtain fifth table conversion data; for generating the sixth table conversion command for the upper 3n/2-bit image data to obtain the sixth table conversion data; for generating the seventh table conversion command for lower n/2-bit conversion data of the 2n-bit image data and the sixth table conversion data to obtain the seventh table conversion data; for generating the linear combination command to obtain seventh linearly combined data, wherein the coefficient for the fifth lower n-bit conversion data of the fifth table conversion data is 1, the coefficient for seventh lower n-bit conversion data of the seventh table conversion data is 1, other coefficients and the bias number are 0, and the shift bit number is 1; for generating the difference absolute value operation command for the fifth lower n-bit conversion data and the seventh lower-bit conversion data to obtain second absolute value data; for generating the eighth table conversion command for the seventh linearly combined data, and lowermost 1-bit data of the second absolute value data to obtain the eighth table conversion data lower n-bit conversion data of the eighth table conversion data being lower n-bit resultant data of the 2n-bit resultant data; for generating the linear combination command to obtain eighth linearly combined data, wherein the coefficient for fifth upper n-bit conversion data of the fifth table conversion data is 1, the coefficient for seventh upper n/2-bit conversion data of the seventh table conversion data is 1, other coefficients and the bias number are 0, and the shift bit number is 1; for generating the difference absolute value operation command for the fifth upper n-bit conversion data and the seventh upper n/2-bit conversion data to obtain third absolute value data; for generating the eighth table conversion command for the eighth linearly combined data and lowermost 1-bit data of the third absolute value data to obtain the ninth table conversion data, and for generating the linear combination command to obtain ninth linearly combined data as upper n-bit resultant data of the 2n-bit resultant data, wherein the coefficient for uppermost 1-bit conversion data of the eighth conversion data is 1, the coefficient for ninth table conversion data is 1, other coefficients and the bias number are 0, and the shift bit number is 0.

9. A method for executing a 2n-bit operation, n being a positive even integer, between image data, comprising the steps of:

linearly combining K input n-bit to-be-combined data, K being an integer $\geq 2$, in accordance with a linear combination command to obtain combination data of n bits from a most significant bit of the linearly combined data;

converting to-be-converted data into conversion data in response to a data conversion command, wherein the number of bits of to-be-converted data does not exceed m bits, m being an integer satisfying the equation $3n/2 \leq m \leq 2n$; and successively and selectively generating one of the linear combination command and the data conversion command in response to an operation instruction, and for designating at least one of the combination data, the conversion data, and the image data as one of the to-be-combined data and the to-be-converted data in accordance with the generated command.

10. The method according to claim 9, wherein said generating step further comprises the step of generating a table generation command in accordance with the operation instruction, and the method further comprises the step of generating the data conversion tables in response to the table generation command.

11. The method according to claim 9, wherein the operation instruction is a 2n-bit addition instruction for obtaining 2n-bit resultant data from 2n-bit image data and n-bit image data, and said generating step includes the steps of:

generating a first linear combination command $2^n$x (upper n-bit image data of the 2n-bit image data), lower n-bit image data of the 2n-bit image data, and the n-bit image data to obtain first combination data as upper n-bit resultant data of the 2n-bit resultant data;

generating a second linear combination command for the first linearly combined data and $-1$x (the upper n-bit image data) to obtain second combination data; and generating a third linear combination command for $-2^n$x (the second linearly combined data), the lower n-bit image data, and the n-bit image data to obtain third combination data as lower n-bit resultant data of the 2n-bit resultant data.

12. The method according to claim 9, wherein the operation instruction is a multiplication instruction for obtaining 2n-bit resultant data from first and second n-bit image data, said converting step includes the steps of:

converting first n-bit to-be-converted data and first n/2-bit to-be-converted data into first table conversion data representing multiplication results of the first n-bit to-be-converted data by the first n/2-bit to-be-converted data in response to a first table conversion command as the data conversion command;

converting second n-bit to-be-converted data and second n/2-bit to-be-converted data into second table conversion data representing multiplication results of the second n-bit to-be-converted data by the second n/2-bit to-be-converted data in response to a second table conversion command as the data conversion command;

converting third n-bit to-be-converted data and third n/2-bit to-be-converted data into third table conversion data representing addition results of the third n-bit to-be-converted data to the third n/2-bit to-be-converted data in response to a third table conversion command as the data conversion command, said generating step includes the steps of:

generating a first table conversion command for the first n-bit image data and lower n/2-bit image data of the second n-bit image data to obtain the first table conversion data;

generating a second table conversion command for the first n-bit image data and lower n/2-bit image data of the second n-bit image data to obtain the second table conversion data;

generating a third table conversion command for lower n-bit conversion data of the first table conversion data and lower n/2-bit conversion data of the second table conversion data to obtain the third table conversion data, lower n-bit conversion data of third table conversion data being lower n-bit resultant data of the 2n-bit resultant data; and generating a linear combination command for upper n/2-bit conversion data of the first table conversion data, upper n-bit conversion data of the second table conversion data, and upper 1-bit conversion data of the third table conversion data to obtain fourth combination data as upper n-bit resultant data of the 2n-bit resultant data.

13. The method according to claim 9, wherein said linearly combining step further comprises the step of calculating absolute value data of a difference between two input n-bit to-be-calculated data in accordance with a difference absolute value operation command, and said generating step further comprises the step of selectively generating a difference absolute value operation command in response to the input operation instruction.

14. The method according to claim 13, wherein the operation instruction is a 2n-bit addition command for obtaining 2n-bit resultant data from 2n-bit image data and n-bit image data, said converting step includes the steps of converting fourth n-bit to-be-converted data and fourth 1-bit to-be-converted data into fourth table conversion data representing addition results of 2x (the fourth n-bit to-be-converted data) to the fourth 1-bit to-be-converted data in response to a fourth table conversion command, and said generating step includes the steps of:

generating the linear combination command for lower n-bit image data of the 2n-bit image data and the n-bit image data to obtain fifth combination data;

generating the difference absolute value operation command for the lower n-bit image data and then-bit image data to obtain first absolute value data;

generating a fourth table conversion command for the fifth linearly combined data and lowermost 1-bit data of the first absolute value data to obtain the fourth table conversion data, lower n-bit conversion data of the fourth table conversion data being lower n-bit resultant data of the 2n-bit resultant data;

generating the difference value operation command for the lower n-bit image data and then-bit image data to obtain first absolute value data;

generating a fourth table conversion command for the fifth combination data and lowermost 1-bit data of the first absolute value data to obtain the fourth table conversion data, lower n-bit conversion data of the fourth table conversion data being lower n-bit resultant data of the 2n-bit resultant data; and generating the linear combination command for upper n-bit image data of the 2n-bit image data and uppermost 1-bit conversion data of the fourth table conversion data to obtain sixth combination data as upper n-bit resultant data of the 2n-bit resultant data.

15. The method according to claim 13, wherein the operation instruction is a division instruction for dividing 2n-bit image data with a designated integer below $2^n-1$ to obtain 2n-bit resultant data, said converting step includes the steps of:

converting fifth 3n/2-bit to-be-converted data into fifth table conversion data representing a quotient of the fifth 3n/2-bit to-be-converted data with the integer, in accordance with a fifth table conversion command as the data conversion command;

converting sixth 3n/2-bit to-be-converted data into sixth table conversion data representing a surplus of the sixth 3n/2-bit to-be-converted data in accordance with a sixth table conversion command as the data conversion command;

converting a sum of the seventh n/2-bit to-be-converted data and the sixth table conversion data into seventh table conversion data representing quotients of the sum with the integer, in accordance with a seventh table conversion command as the data conversion command; and converting eighth n-bit to-be-converted data and eighth 1-bit to-be-converted data into eighth table conversion data representing addition results of 2x(the eighth n-bit to-be-converted data) to the eighth 1- bit to be-converted data in accordance with an eighth table conversion command as the data conversion command, and said generating step includes the steps of:

generating the fifth table conversion command for upper 3n/2-bit image of the 2n-bit image data to obtain the fifth table conversion data;

generating the sixth table conversion command for the upper 3n/2-bit image data to obtain the sixth table conversion data;

generating the seventh table conversion command for lower n/2-bit conversion data of the 2n-bit image data and the sixth table conversion data to obtain the seventh table conversion data;

generating the linear combination command for fifth lower n-bit conversion data of the fifth table conversion data and seventh lower n-bit conversion data of the seventh table conversion data to obtain seventh combination data;

generating the difference absolute value operation command for the fifth lower n-bit conversion data and the seventh lower n-bit conversion data to obtain second absolute value data;

generating the eighth table conversion command for the seventh combination data and lowermost 1-bit data of the second absolute value data to obtain the eighth table conversion data, lower n-bit conversion data of the eighth table conversion data being lower n-bit resultant data of the 2n-bit resultant data;

generating the linear combination command for fifth upper n-bit conversion data of the fifth table conversion data and seventh upper n/2-bit conversion data of the seventh table conversion data to obtain eighth combination data;

generating the difference absolute value operation command for the fifth upper n-bit conversion data and the seventh upper n/2-bit conversion data to obtain third absolute value data;

generating the eighth table conversion command for the eighth combination data and lowermost 1-bit data of the third absolute value data to obtain the ninth table conversion data; and generating the linear combination command for uppermost 1-bit conversion data of the eighth table conversion data and ninth table conversion data to obtain ninth combination data as upper n-bit resultant data of the 2n-bit resultant data.

16. An apparatus for executing a 2n-bit operation, n being a positive even integer, between image data stored in image memories, comprising:

a plurality of linear operation means for linearly combining input n-bit to-be-combined data in accordance with an input linear combination command to obtain combination data of n bits from a most significant bit of the linearly combined data;

a plurality of conversion means, each having a conversion table, for converting input to-be-converted data into conversion data in accordance with an input data conversion command, wherein the number of bits of to-be-converted data does not exceed m bits, m being an integer satisfying the equation $3n/2 \leq m < 2n$; and operation control means for selectively generating the linear combination commands for said plurality of linear operation means and the data conversion commands for said plurality of conversion means in response to an input operation instruction, respectively, and for designating the combination data, the conversion data, and the image data as one of the to-be-combined data and the to-be-converted data in accordance with the generated command.

17. The apparatus according to claim 16, wherein each of said plurality of conversion means comprises a ROM for storing the conversion table.

18. The apparatus according to claim 16, wherein each of said plurality of conversion means comprises a RAM for storing the conversion table, said operation control means further comprises means for generating a table generation command in accordance with the operation instruction, said operation control means further comprises means for generating a table generation command in accordance with the operation instruction, and said apparatus further comprises table generation means for generating the conversion table in response to the table generation command from said operation control means too store the generated table in said RAM.

19. The apparatus according to claim 16, wherein each of said plurality of linear operation means further comprises means, responsive to an input difference absolute value operation command, for calculating absolute value data of a difference between two input n-bit to-be-calculated data, and said operation control means further comprises means, responsive to the input operation instruction, for selectively generating the difference absolute value operation command.

* * * * *